United States Patent [19]

Petolino, Jr.

[11] Patent Number: 5,838,946
[45] Date of Patent: Nov. 17, 1998

[54] METHOD AND APPARATUS FOR ACCOMPLISHING PROCESSOR READ OF SELECTED INFORMATION THROUGH A CACHE MEMORY

[75] Inventor: Joseph Anthony Petolino, Jr., Palo Alto, Calif.

[73] Assignee: Sun Microsystems, Inc., Mountain View, Calif.

[21] Appl. No.: 523,217

[22] Filed: Sep. 5, 1995

Related U.S. Application Data

[63] Continuation of Ser. No. 236,679, May 2, 1994, abandoned, which is a continuation of Ser. No. 931,906, Aug. 18, 1992, abandoned, which is a continuation of Ser. No. 504,634, Apr. 14, 1990, abandoned.

[51] Int. Cl.[6] .................................................. G06F 12/12
[52] U.S. Cl. .......................... 395/461; 395/471; 395/472; 395/486; 395/492; 364/DIG. 1
[58] Field of Search .................................. 395/461, 471, 395/472, 486, 492

[56] References Cited

U.S. PATENT DOCUMENTS

| | | | |
|---|---|---|---|
| 4,075,686 | 2/1978 | Calle et al. | 395/425 |
| 4,197,580 | 4/1980 | Chang et al. | 395/425 |
| 4,648,034 | 3/1987 | Heninger | 364/200 |
| 4,794,523 | 12/1988 | Adan et al. | 364/200 |
| 4,794,524 | 12/1988 | Carberry et al. | 364/200 |
| 4,831,581 | 5/1989 | Rubinfeld | 364/200 |
| 4,885,680 | 12/1989 | Anthony et al. | 364/200 |
| 4,905,188 | 2/1990 | Chuang et al. | 364/900 |
| 4,914,577 | 4/1990 | Stewart et al. | 364/200 |
| 5,025,365 | 6/1991 | Mathur et al. | 364/200 |
| 5,034,885 | 7/1991 | Matoba et al. | 364/200 |
| 5,091,846 | 2/1992 | Sachs et al. | 395/250 |
| 5,091,850 | 2/1992 | Culley | 395/400 |
| 5,119,485 | 6/1992 | Ledbetter, Jr. et al. | 395/425 |
| 5,136,691 | 8/1992 | Baror | 395/200 |
| 5,144,692 | 9/1992 | Baker et al. | 395/425 |
| 5,148,526 | 9/1992 | Nishimukai et al. | 395/275 |
| 5,148,536 | 9/1992 | Witek et al. | 395/425 |
| 5,157,774 | 10/1992 | Culley | 395/425 |
| 5,197,144 | 3/1993 | Edenfield et al. | 395/425 |
| 5,201,041 | 4/1993 | Bohner et al. | 395/425 |
| 5,202,972 | 4/1993 | Gusefski et al. | 395/425 |

*Primary Examiner*—Reba I. Elmore
*Attorney, Agent, or Firm*—Blakely Sokoloff Taylor & Zafman

[57] ABSTRACT

The present invention provides for a method and apparatus for reading non-cachable information in a cache memory system. The cache memory system includes a processor, a buffer, a multiplexor, main memory, an input/output unit, a cache controller, a memory management unit, and cache memory. In a read operation, the processor directs a read operation specifying a first address to the cache memory. The cache controller initially determines whether the information desired is cachable or non-cachable. If the information desired is determined to be non-cachable, the cache controller causes any information presently contained in a first location in the cache memory to be stored in the buffer. In the interim, the cache controller causes the memory management unit to initiate an access of the information desired from the first address. Once accessed, this information is temporarily written into the first location within the cache memory. From this first location within the cache memory, the information is coupled, as desired, to the processor. The cache controller then restores the information formerly in the first location, by coupling the contents of the buffer back into the first location within the cache memory.

19 Claims, 4 Drawing Sheets

METHOD AND APPARATUS FOR ACCOMPLISHING PROCESSOR READ OF SELECTED INFORMATION THROUGH A CACHE MEMORY

This is a continuation of application Ser. No. 08/236,679 filed May 2, 1994 now abandoned, which is a continuation of application Ser. No. 07/931,906 filed on Aug. 18, 1992, which was a continuation of application Ser. No. 07/504,634 filed on Apr. 14, 1990 abandoned.

BACKGROUND OF THE INVENTION

1. Field of the Invention

This invention relates to computer memory arrangements and, more particularly, to methods and apparatus for implementing the operation of cache memories in handling non-cachable data.

2. History of the Prior Art

In computer systems, the access of main memory to retrieve information often takes a substantial portion of the operational time. This occurs for various reasons. First, main memory is made of random access memory. Such memory is often sufficiently large that the cost is kept within bounds by using relatively slow memory. Second, in systems using virtual memory arrangements to increase the addressable space without increasing the physical size of the main memory, it is necessary to swap information not presently available in main memory from long term memory by means of memory management arrangements. These memory management arrangements utilize look-up tables in which virtual addresses are translated to physical addresses so that addressing of main memory is not direct but requires a translation. This indirect addressing requires a substantial amount of time.

For this reason, the use of cache memories to increase system speed has become prevalent in more advanced systems. A cache memory makes use of a relatively small amount of fast random access memory in which recently used instructions and data are stored as they are used by a processor. Such instructions and data are then available in the cache to be more rapidly accessed by the associated processor when next required. The basic theory of caching is that, in general, information which has been recently used is more likely to be used sooner than is other information. The cache memory is often both physically faster than the random access memory used for main memory and is arranged so that it may be addressed more rapidly than may main memory by obviating the need for the look-up operation to determine physical addresses. Such caching arrangements have operated to greatly increase the speed of operation of computer systems for certain types of information.

In high speed computer systems, the inter-connections between a processor and its associated cache memory may be the most time-critical connections in the system. Consequently, computer systems utilizing cache memories often utilize hardware arrangements in which information which must be accessed in main memory is transferred to a position in the cache memory before use by the central processing unit. In this manner, a processor need deal with only one physical arrangement for accessing information since it always goes to the cache on an access of memory.

Caching works well in situations where information is used over and over again in carrying out an operation. An example of such a use is executing a looping instruction operation. Caches do not usually work well in many other situations such as in dealing with input/output operations. Consequently, many systems now include methods for disabling caching in certain situations.

In a system where information is normally cached before use by a processor, some arrangement must be provided to handle non-cachable data. If some form of bypass hardware is provided, a substantial increase in hardware expense and a possible increase in the time required to execute operations may be incurred. If the cache memory path is used for non-cachable information, the storage of such information may interfere with the storage of other valid information.

SUMMARY OF THE INVENTION

It is, therefore, an object of the present invention to provide apparatus for handling non-cachable information in a system utilizing a cache memory and handling all access to memory therethrough.

It is another more specific object of the present invention to provide an arrangement for storing non-cachable information in a cache memory associated with a processor without interfering with valid information stored in that cache memory.

These and other objects of the present invention are realized in a memory arrangement which comprises main memory, a cache memory, a buffer for storing information to be transferred to main memory from the cache memory, circuitry for furnishing the non-cachable information to a selected address of the cache memory, and control circuitry for moving information from the selected position of the cache memory to the buffer when non-cached information is being handled and for restoring that information to the selected position of the cache memory when the non-cachable information has been handled.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method of operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Historically, it has been found that the utilization of cache memory may significantly accelerate the operation of a computer system. However certain information is treated as non-cachable. For example, it is typical of such systems that all non-memory accesses such as those for input/output information be labeled as non-cachable.

However, to attain high speeds many systems utilize hardware arrangements in which all information which is accessed is transferred to a position in the cache memory before use by the central processing unit. In this manner, a processor need deal with only one physical arrangement for accessing information since it always goes to the cache on an access of memory. In systems which are adapted to make all memory accesses to the cache memory, some provision must be made for transferring the non-cachable information to the processor.

Figure 1:
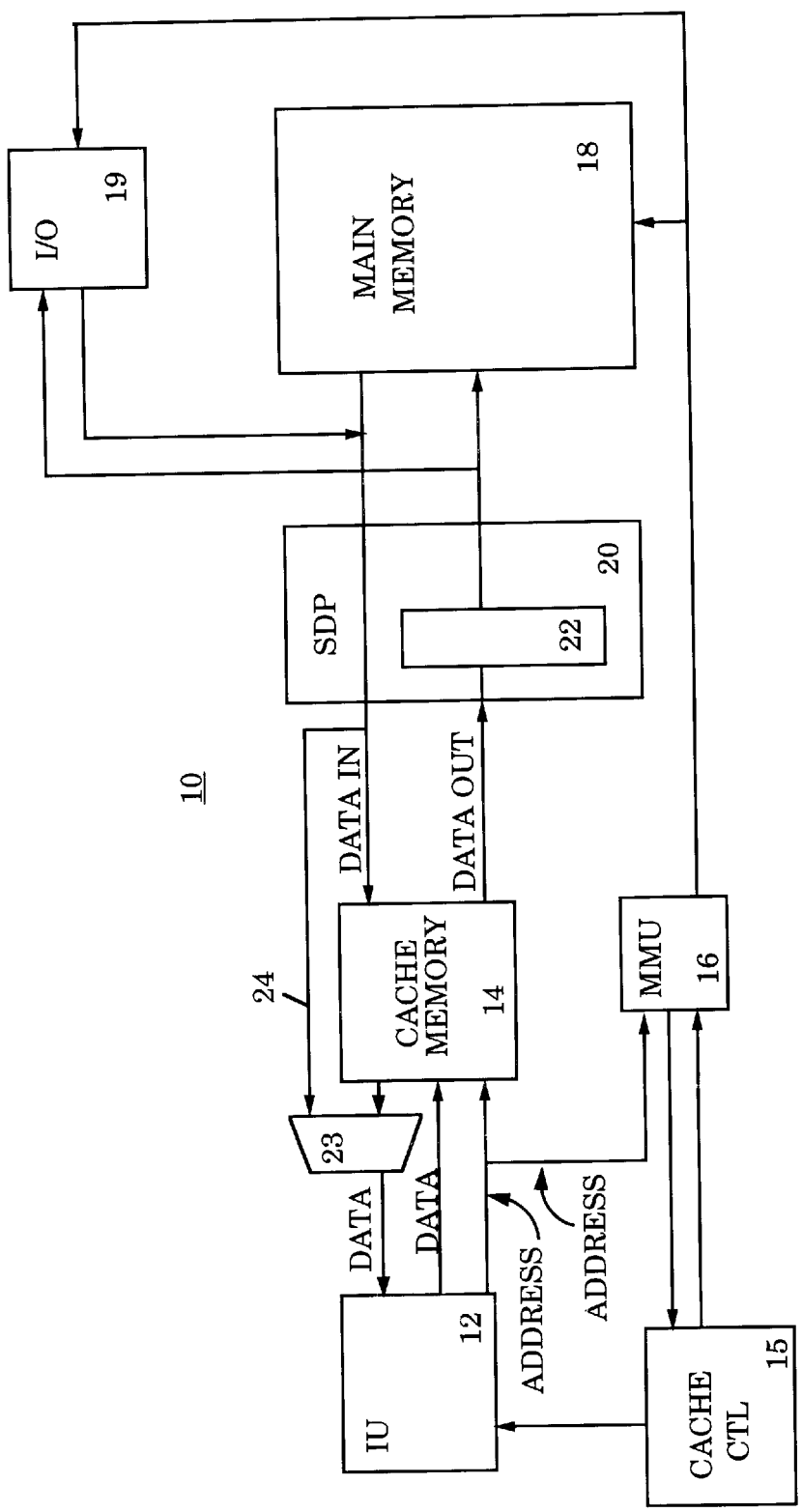
FIG. 1 is a block diagram illustrating an arrangement in accordance with the prior art.

FIG. 1 illustrates in very basic outline a computer system 10 of the prior art. The arrangement disclosed is that used in some of the SPARC-based RISC computers designed and manufactured by Sun Microsystems, Inc., Mountain View, California. Other computer systems may also make use of the invention, but all of the premised system requirements are included in such a SPARC-based system. The system 10 includes an integer unit 12 joined by data and address lines to a cache memory 14. The system 10 includes a cache controller 15 which controls the accessing of the cache memory 14 and takes over the access operation in the case of a cache miss. The address lines from the integer unit 12 are also directed to a memory management unit 16, which through an arrangement of look-up tables, translates virtual to physical addresses in such a system 10. Stored with the address information in the memory management unit 16 is an indication that the information at each address is either cachable or non-cachable. This indication may be a single bit of storage associated with each address which is set to indicate that the information is cachable.

Upon a read access by the integer unit 12 which results in a cache miss, the cache controller circuit 15 halts the operation of the integer unit 12 by asserting a signal MHOLD until the information accessed has been provided. During this halt, the integer unit 12 continues to assert the address of the desired access on the address lines. The cache controller 15 causes the memory management unit 16 to provide the physical address of information being accessed to the main memory 18 and to an input/output unit 19. If the information accessed on a read operation is in main memory, it is transferred from main memory 18 by a system data path 20 to a position in cache memory 14. Once in the cache memory 14, the information is available for use by the integer unit 12 and may be placed directly in the input registers of the integer unit 12.

It will be recognized by those skilled the art that there are many forms of cache memory which may be provided for use with a particular processor. In many of these forms of cache memory, information from a number of different physical locations in main memory may map to the same location in cache memory. Consequently, after some finite period of time, information stored in a position in cache memory 14 may have to be replaced by other information needed by the integer unit 12. Some cache memory systems (called write back systems) do not transfer information written to the cache memory to main memory as soon as it is placed in the cache memory by a processor but retain that information until some later more convenient time. Such systems tend to make less use of the system bus and are thus faster. Consequently, valid information residing at a position in the cache memory 14 in which the results of a read of main memory are to be stored may not yet have been transferred to main memory 18 so that the storage of new information would cause the loss of the old information.

Figure 2:
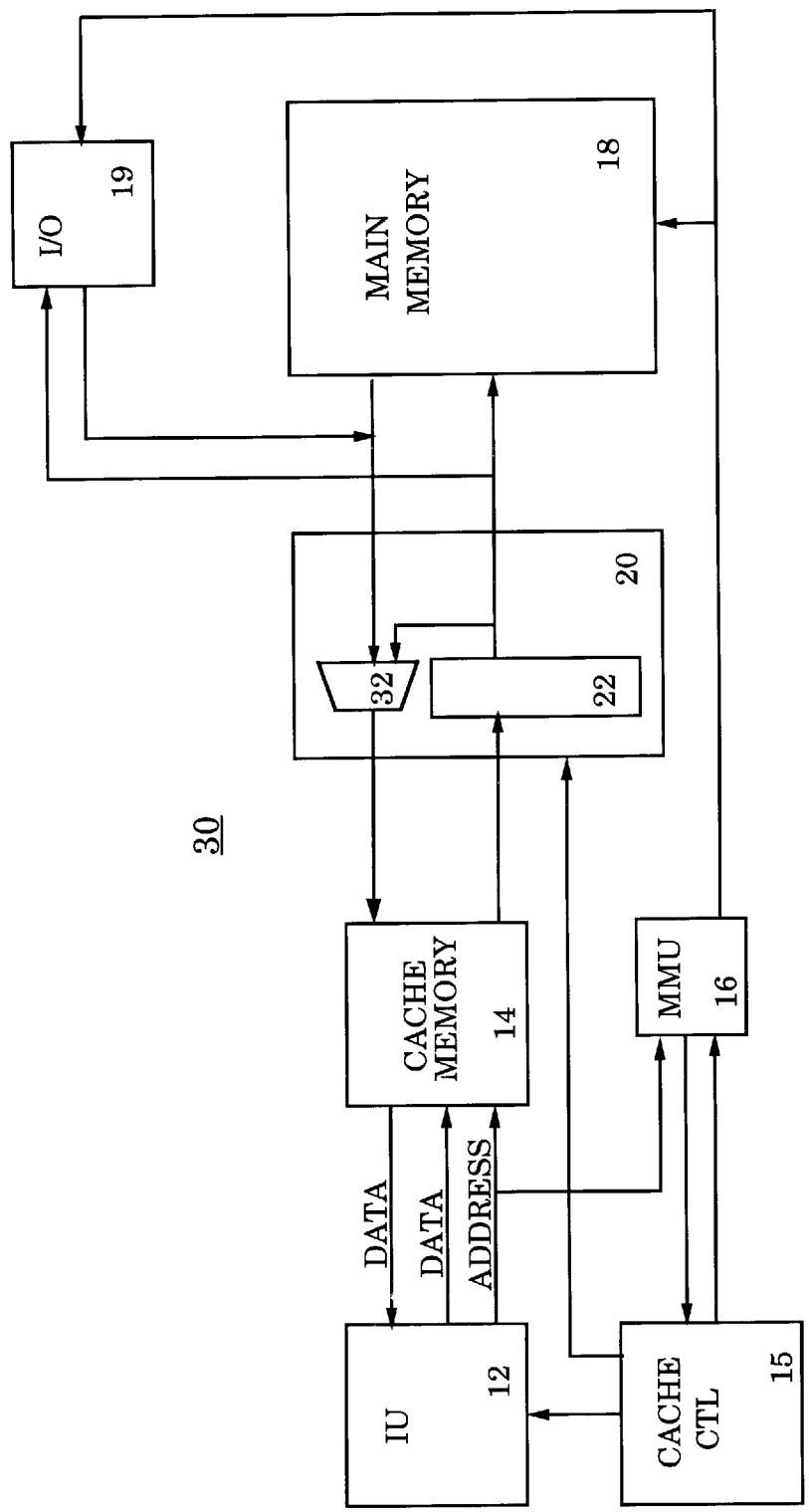
FIG. 2 is a block diagram illustrating an arrangement in accordance with the invention.

The system 10 illustrated in FIG. 1 utilizes a buffer stage 22 in the system data path 20 to store information located at a cache memory position being accessed when a cache miss occurs so that (1) information may be transferred to update main memory 18 and (2) the cache memory location may be used to store the information read from main memory on the cache memory miss. In operation, the integer unit 12 directs a read request to the cache memory 14. On a miss in cache memory 14, the cache controller 15 delays the operation of the pipeline of the integer unit 12, causes the memory management unit 16 to look up the physical address of the information, and accesses that information in main memory 18. In the meantime, the information at the address in cache memory 14 at which the miss occurred (and which is to hold the accessed information) is stored in the buffer 22. When the information accessed in main memory 18 is placed in the cache memory 14, the cache controller 15 causes the information in the buffer 22 to be stored in main memory 18 to update the stale information therein. At this point, the new information resides in the cache memory 14 and is available to the integer unit 12 for use. However, when a cache miss occurs because the information desired is labeled non-cachable (such as information accessed in input/output unit 19), the information is transferred from the input/output unit 19 by the system data path 20 to a separate data path 24 which bypasses the cache memory 14. The data path 24 connects to a multiplexor 23 which normally transfers information from the cache memory 14 to the integer unit 12. The multiplexor 23 responds to the non-cachable indication and furnishes the non-cachable information to the integer unit 12 so that the cache memory 14 is not disturbed. Such an arrangement using a multiplexor 23 is quite expensive from a hardware view, and the attendant delay associated therewith is even more expensive to efficient operation in a time-critical RISC computer. The present invention, as illustrated in FIG. 2, provides an arrangement for handling non-cachable information in a system such as that illustrated in FIG. 1 in which the integer unit 12 directly accesses the cache memory 14 for information. Referring to FIG. 2, the system 30 includes each of the previously described circuit elements except for the multiplexor 23 and the bypass data path 24. In addition, the system 30 includes a multiplexor 32 which is a portion of the system data path 20 and functions in the manner described below to assist in the operation of the invention.

When, on any access by the integer unit 12, it is determined that the requested data is not resident in the cache memory 14, the cache controller 15 halts the pipeline of the integer unit 12 by asserting the MHOLD signal and takes over the operation until the desired information is available. During this period, the address of the information desired remains on the address lines from the integer unit 12 to the cache memory 14. The cache controller 15 determines from the memory management unit 16 whether the information desired is cachable or not by reviewing the information bit stored with the address by the memory management unit 16. If the information is cachable, the operation proceeds as described above except that the information accessed in main memory 18 is transferred under control of the cache controller 15 by the multiplexor 32 to the cache memory 14.

If, on the other hand, on a read access, the information is determined to be non-cachable, the cache controller 15 causes the information presently at the accessed location of the cache memory 14 to appear on the data-out lines of the cache memory 14 because the integer unit 12 still addresses the desired address in the cache memory 14. The cache controller 15 sends control signals to the system data path unit 20 causing this data to be stored in the buffer 22. In the interim, the cache controller 15 causes the memory management unit 16 to initiate a look-up of the physical address accessed and, using this address, initiates an access of the main memory 18 or other addressed location such as input/output unit 19. When the information resulting from the read access is available, it is written into the accessed location of the cache memory 14 via the normal channel through multiplexor 32. The cache controller 15 then asserts a signal to the integer unit 12 which writes the information at the accessed location of the cache memory 14 into the input register of the integer unit 12 for use so that the integer unit 12 is provided the desired non-cachable information.

Figure 3:
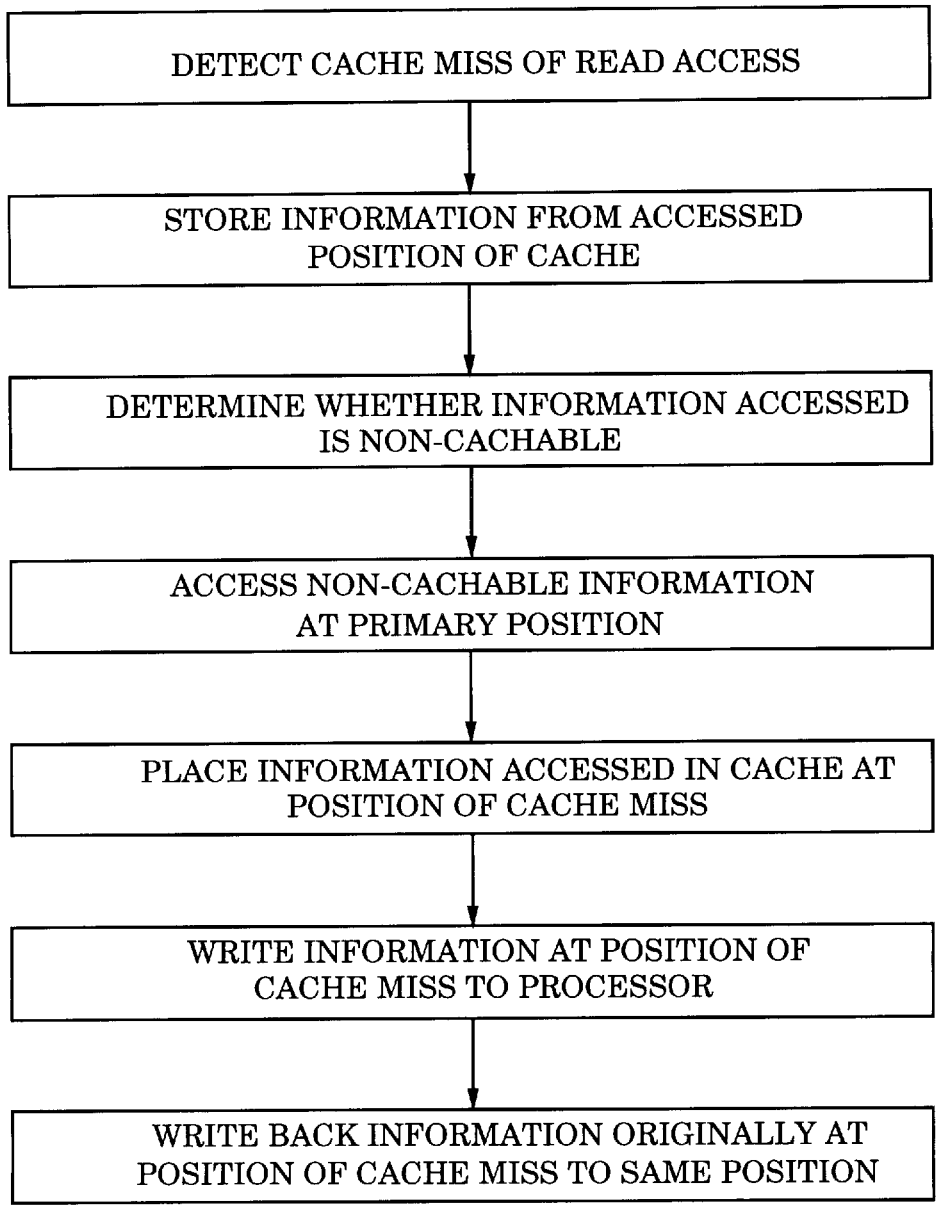
FIG. 3 is a chart indicating the flow of operations in carrying out the process of this invention.
Figure 4:
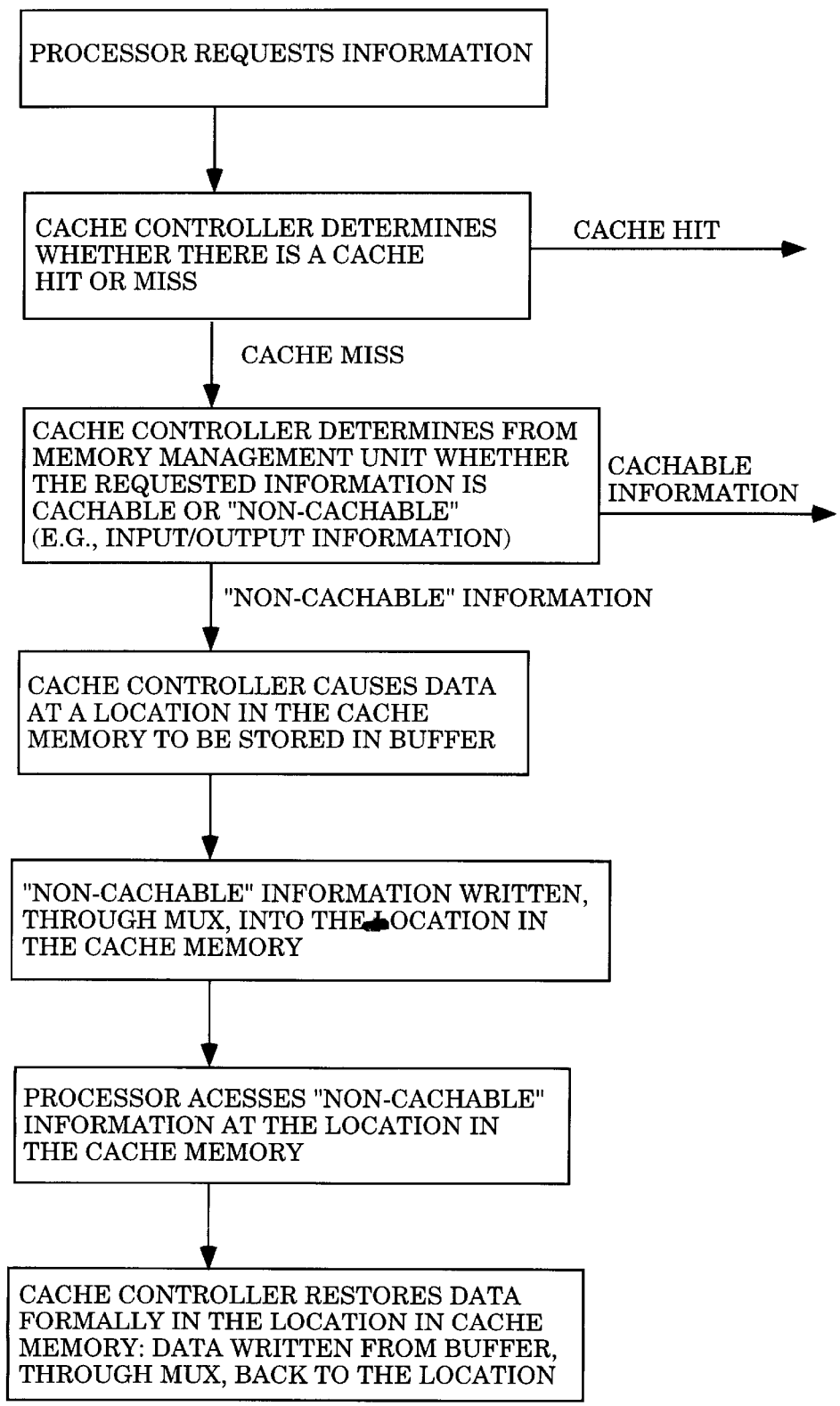
FIG. 4 is a flow chart illustrating, in greater detail, the method of the present invention.

The cache controller 15 (in an operation which is not time critical) restores the information formerly at the accessed address of the cache memory 14 by writing the contents from the buffer 22 into the previously accessed position of the cache memory 14 through the multiplexor 32. This restores the cache memory 14 to its former condition. At this point, the operation by which the non-cachable information is furnished to the integer unit 12 is complete, and the cache controller 15 releases its control of the pipeline to the integer unit 12. Referring to FIGS. 3 and 4, these figures illustrate in flow chart form, the preceding method. FIG. 4, in particular, illustrates this method in detail.

It will be appreciated by those skilled in the art that the present invention operates to increase the speed at which cachable information may be accessed by the integer unit 12 without a great increase in hardware cost and without interfering with information stored in the cache memory 14. The present invention eliminates the expense of the multiplexor 23 of FIG. 1 and the delays occasioned by its use.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
    a device for providing information;
    a cache for storing information;
    a buffer coupled to said cache;
    a processor for issuing a read request identifying requested information available from one of said cache and said device for providing information;
    a device for determining whether the requested information is available from said cache, and, if not available from said cache, for determining whether the requested information is of a first type or a second type; and
    a device, responsive to a determination that the requested information is not available from said cache and is of a second type, for reading the requested information, in sequence, by
        transferring selected information from said cache into the buffer,
        transferring the requested information from said device for providing information into said cache,
        transferring the requested information from said cache to said processor, and
        transferring the selected information from said buffer back into said cache.

2. The system of claim 1, further including
    a device, responsive to a determination that the requested information that is not in said cache is of a first type, for, in sequence,
        transferring the requested information from said device for providing information into said cache, and
        transferring said requested information from said cache to said processor.

3. The system of claim 1, wherein said device for providing information is a main memory.

4. The system of claim 1, wherein said device for providing information is an input/output device.

5. The system of claim 1, wherein said device for providing information is an input/output unit and wherein said second type of information is input/output information.

6. The system of claim 1, wherein said second type of information is information which is not advantageously stored in the cache because the processor does not require repeated access to the information.

7. In a computer system having a processor, a cache for storing information, a buffer coupled to the cache, and a device for providing information, wherein the processor issues read requests identifying requested information available from one of the cache or the device, and wherein requested information is of a first type or a second type, a method for retrieving the requested information comprising the steps of:
    determining whether the requested information is available from the cache;
    if the requested information is not available from the cache, determining whether the requested information is of the first type or the second type; and
    if the requested information is not in the cache and is of the second type
        transferring selected information from the cache into the buffer,
        transferring the requested information from the device into the cache,
        transferring the requested information from the cache to the processor, and
        transferring the selected information from the buffer back into the cache.

8. In a computer system comprising a processor, a cache memory coupled to said processor, a buffer coupled to said cache memory, a cache controller coupled to said processor, a memory management unit coupled to said cache controller, and a device coupled to said cache memory and said memory management unit, a method for said processor to accomplish a read access of information residing in said device, said method comprising the steps of:

(a) said processor initiating a read request for information;

(b) in response to said read request, said cache controller determining whether said information requested by said processor is presently in said cache memory;

(c) if said information is not presently in said cache memory, said cache controller determining whether said information requested by said processor corresponds to a first predetermined type of information or a second predetermined type of information;

(d) if said information corresponds to said second predetermined type of information, said second predetermined type of information residing in said device, said cache controller causing data contained in a location within said cache memory to be stored in said buffer;

(e) writing said information requested by said processor from said device to said location in said cache memory;

(f) said processor accessing said information from said location in said cache memory; and (g) said cache controller causing said data to be restored to said location in said cache memory.

9. The method as provided in claim 8, wherein said device comprises an input/output unit, and said step of writing said information requested by said processor from said device to said location in said cache memory comprises the step of writing said information requested by said processor from said input/output unit to said location in said cache memory.

10. The method as provided in claim 8, wherein said device comprises main memory, and said step of writing said information requested by said processor from said device to said location in said cache memory comprises the step of writing said information requested by said processor from said main memory to said location in said cache memory.

11. The method as provided in claim 8, wherein said device comprises an input/output unit and wherein said second predetermined type of information is input/output information.

12. The method as provided in claim 8, wherein step (g) comprises the step of causing said data to be written from said buffer into said location in said cache memory.

13. The method as provided in claim 8, wherein said second predetermined type of information is information which is not stored in the cache memory because the processor does not need repeated access to this type of information.

14. In a computer system comprising a processor, a cache memory coupled to said processor, a buffer coupled to said cache memory, a multiplexer coupled to said cache memory and said buffer, a cache controller coupled to said processor, a memory management unit coupled to said cache controller, a main memory coupled to said memory management unit and said multiplexer, an input/output unit coupled to said multiplexer and said memory management unit, a method for said processor to accomplish a read access of information residing in said input/output unit, said method comprising the steps of:

said processor issuing a read request for information residing in said input/output unit;

in response to said read request, said cache controller causing data contained in a location within said cache memory to be stored in said buffer;

writing said information requested by said processor from said input/output unit, through said multiplexer, to said location within said cache memory;

said processor reading said information from said location within said cache memory;

following said processor reading said information from said location, said cache controller causing said data to be written from said buffer, through said multiplexer, to said location in said cache memory.

15. A computer system comprising:

a device for providing information;

a cache having at least one cache memory location for storing information;

a buffer coupled to said cache;

a multiplexer having a first input coupled to said device for providing information, a second input coupled to said buffer, an output coupled to said cache, and a control input;

a processor for issuing a read request identifying requested information available from one of said cache and said device for providing information;

a device for determining whether the requested information is available from said cache, and, if not available from said cache, for determining whether the requested information is cacheable or non-cacheable; and a cache controller device having an output for generating a control signal to said control input of said multiplexer and, in response to a determination that the requested information is not available from said cache and the requested information is non-cacheable, for reading the requested information, in sequence, by transferring selected information from a cache memory location into the buffer, transferring the requested information from said device for providing information into said cache memory location via said first input of said multiplexer, transferring the requested information from said cache memory location to said processor, and transferring the selected information from said buffer into said cache memory location via said second input of said multiplexer.

16. The system of claim 15, further including a device, responsive to a determination that the requested information that is not in said cache is cacheable, for, in sequence, transferring the requested information from said device for providing information into a cache memory location, and transferring said requested information from said cache memory location to said processor.

17. The system of claim 16, wherein said device for providing information is a main memory.

18. The system of claim 16, wherein said device for providing information is a an input/output device.

19. The system of claim 18, wherein said device for providing information is an input/output unit and wherein said non-cacheable information is input/output information.

* * * * *